United States Patent
Zajac, III

(10) Patent No.: US 11,423,879 B2
(45) Date of Patent: Aug. 23, 2022

(54) VERBAL CUES FOR HIGH-SPEED CONTROL OF A VOICE-ENABLED DEVICE

(71) Applicant: Disney Enterprises, Inc., Burbank, CA (US)

(72) Inventor: William Valentine Zajac, III, La Crescenta, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 15/653,486

(22) Filed: Jul. 18, 2017

(65) Prior Publication Data

US 2019/0027131 A1 Jan. 24, 2019

(51) Int. Cl.
*G10L 15/02* (2006.01)
*A63F 13/424* (2014.01)
*A63F 13/215* (2014.01)
*G06F 3/16* (2006.01)

(52) U.S. Cl.
CPC ............ *G10L 15/02* (2013.01); *A63F 13/215* (2014.09); *A63F 13/424* (2014.09); *G06F 3/167* (2013.01); *G10L 2015/025* (2013.01); *G10L 2015/027* (2013.01)

(58) Field of Classification Search
CPC .............. G06F 3/167; G10L 2015/223; G10L 2015/027; G10L 25/48
See application file for complete search history.

(56) References Cited

U.S. PATENT DOCUMENTS

| | | | |
|---|---|---|---|
| 6,584,439 B1* | 6/2003 | Geilhufe | G10L 15/26 704/270 |
| 2005/0149332 A1* | 7/2005 | Kuzunuki | G10L 15/22 704/270.1 |
| 2007/0195063 A1* | 8/2007 | Wagner | G06F 3/04886 345/169 |
| 2008/0046250 A1* | 2/2008 | Agapi | G10L 15/075 704/275 |
| 2012/0278083 A1* | 11/2012 | Yu | G10L 15/22 704/275 |
| 2013/0054246 A1* | 2/2013 | Newman | G01B 3/1061 704/275 |
| 2013/0169533 A1* | 7/2013 | Jahnke | G06F 3/017 345/158 |
| 2015/0170652 A1* | 6/2015 | Kaplan | G10L 15/22 704/246 |
| 2015/0279360 A1* | 10/2015 | Mengibar | G10L 15/18 704/257 |
| 2015/0317837 A1* | 11/2015 | Sholudko | G06T 19/006 345/633 |
| 2016/0034030 A1* | 2/2016 | Lee | G06F 3/013 345/156 |
| 2016/0189717 A1* | 6/2016 | Kannan | G10L 17/22 704/275 |
| 2016/0293164 A1* | 10/2016 | Shi | G10L 15/1815 |
| 2017/0201609 A1* | 7/2017 | Salmenkaita | H04M 1/6041 |

* cited by examiner

Primary Examiner — Mark Villena
(74) Attorney, Agent, or Firm — Artegis Law Group, LLP

(57) ABSTRACT

A technique for controlling a voice-enabled device using voice commands includes receiving an audio signal that is generated in response to a verbal utterance, generating a verbal utterance indicator for the verbal utterance based on the audio signal, selecting a first command for a voice-controlled application residing within the voice-enabled device based on the verbal utterance indicator, and transmitting the first command to the voice-controlled application as an input.

19 Claims, 6 Drawing Sheets

VERBAL CUES FOR HIGH-SPEED CONTROL OF A VOICE-ENABLED DEVICE

BACKGROUND OF THE INVENTION

Field of the Invention

The present disclosure relates generally to computer science, and, more specifically, to verbal cues for high-speed control of a software application.

Description of the Related Art

Computing devices, such as home automation systems, smart speakers, and gaming consoles, are now equipped with microphones, powerful processors, and advanced speech recognition algorithms. As a result, voice-enabled software applications have come into widespread use. These applications are configured to perform tasks based on voice commands, thereby circumventing the need for a user to provide manual input via a button, control knob, touchscreen, keyboard, mouse, or other input device. For example, using voice commands in conjunction with a voice-enabled software application, a user can modify an audio output volume of a device, select a song to be played by a smart speaker, control a voice-enabled home appliance, etc. Thus, devices configured with voice-enabled software applications (referred to herein as "voice-enabled devices") are well-suited for situations where the user is unable to perform a manual input, or the use of a manual input device is inconvenient.

Despite the positive aspects of voice-enabled devices, trying to control devices using voice input has certain drawbacks. Specifically, the use of complete words or phrases to provide input to a voice-enabled device can be much slower than providing input through other means. For example, when providing commands to a system running an action-based video game using spoken words or phrases, such as "turn left" or "move forward," a user may take up to a second to convey each separate command to the system. Thus, issuing and processing voice commands can be many times slower than repeatedly depressing a mechanical button or turning a joystick on a controller. Accordingly, in situations where interactions with a device need to be fast and/or repetitive, voice-based control can be frustratingly slow or altogether impractical. These downsides can quickly outweigh any conveniences gained in being able to interact with a system or device without using a manual input device.

As the foregoing illustrates, what is needed in the art are more effective techniques for controlling voice-enabled devices.

SUMMARY

One embodiment of the present invention sets forth a technique for controlling a voice-enabled device using voice commands. The technique includes receiving an audio signal that is generated in response to a verbal utterance, generating a verbal utterance indicator for the verbal utterance based on the audio signal, selecting a first command for a voice-controlled application residing within the voice-enabled device based on the verbal utterance indicator, and transmitting the first command to the voice-controlled application as an input.

At least one advantage of the disclosed techniques is that they allow a user of a computing device to quickly input commands via verbal cues to a software application executing on the computing device. A further advantage is that verbal cues that are particularly well-suited for inputting commands can be mapped to multiple different commands, depending on the context in which the verbal cue is received by the computing device.

BRIEF DESCRIPTION OF THE DRAWINGS

So that the manner in which the above recited features of the disclosure can be understood in detail, a more particular description of the disclosure, briefly summarized above, may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

For clarity, identical reference numbers have been used, where applicable, to designate identical elements that are common between figures. It is contemplated that features of one example aspect may be incorporated in other example aspects without further recitation.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

Figure 1:
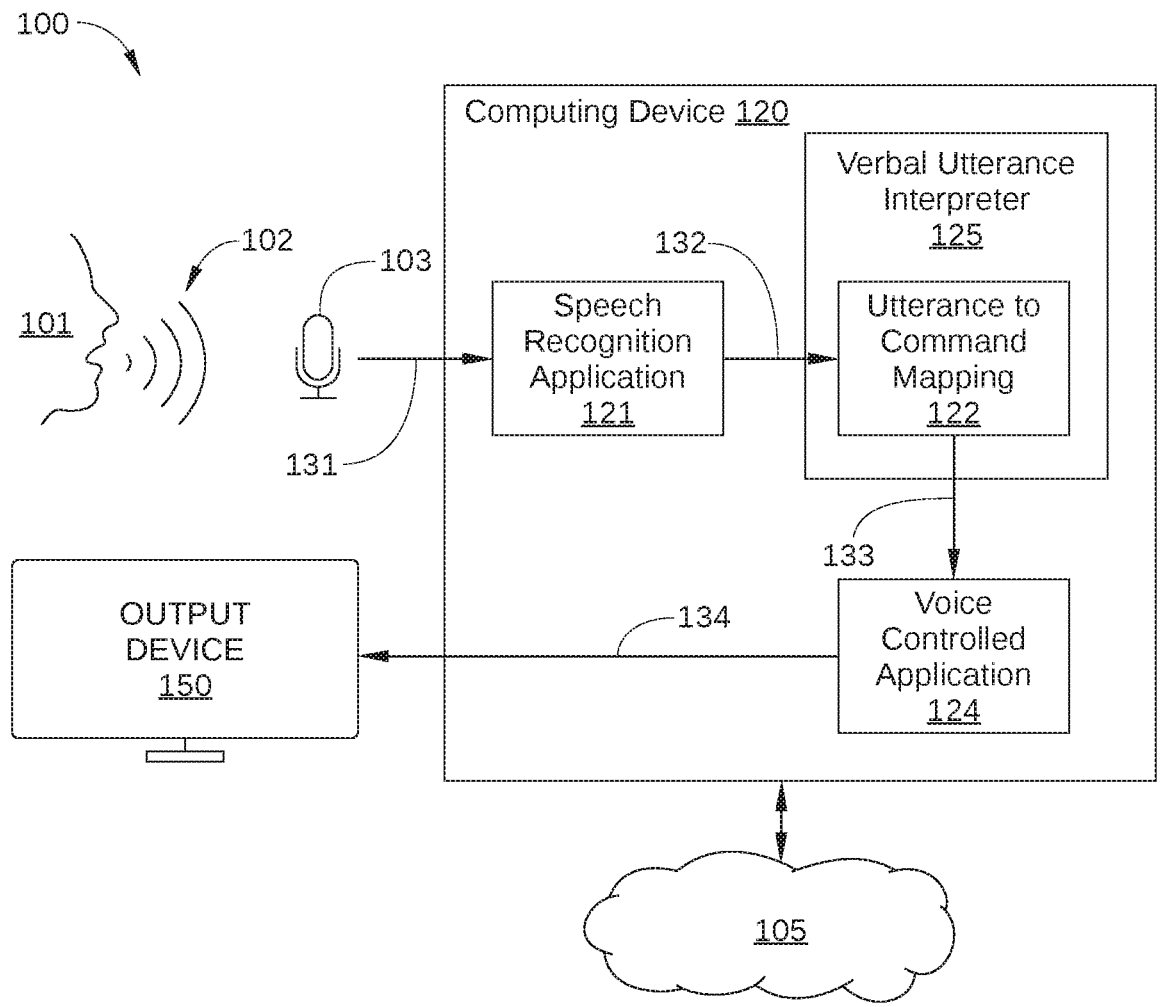
FIG. 1 illustrates a block diagram of a computing system configured to implement one or more aspects of the present invention.

FIG. 1 illustrates a block diagram of a computing system 100, configured implement one or more aspects of the present invention. Computing system 100 includes a computing device 120, one or more microphones, collectively referred to herein as microphone 103, and, in some embodiments, an output device 150. Also shown in FIG. 1 is a user 101, who produces a verbal utterance 102 to interact with one or more voice-controlled applications 124 being executed by computing device 120. Computing system 100 enables verbal utterance 102 to be employed as a verbal cue for high-speed input of commands to one or more voice-controlled applications 124.

Verbal utterance 102 is, according to embodiments described herein, a phonetic fragment that can be pronounced by a user quickly, and is not a completely pronounced word or phrase. In addition, in some embodiments, verbal utterance is a phonetic fragment that is also selected to be pronounced not only quickly, but quickly and repeatedly. Thus, in some embodiments, verbal utterance 102 is a single syllable or a fraction of a syllable. For example, in one such embodiment, verbal utterance 102 is a single consonant followed by a single vowel. Suitable examples of verbal utterance 102 include, without limitation: "juh," which is equivalent to the initial portion of the single-syllable word "jump," "tuh," which is equivalent to the initial portion of the single-syllable word "tut," "lah," which is equivalent to the initial portion of the single-syllable word "lawn," "kah," which is equivalent to the initial portion of the single-syllable word "calm," "mah," which is equivalent to the initial portion of the single-syllable word "mom," and the like. Verbal utterance 102 may include any other suitable phonetic fragments, including phonetic fragments that begin with a vowel, and phonetic fragments that do not include a vowel at all.

Because such phonetic fragments can be selected based on ease and speed of pronunciation, such phonetic fragments can be employed with sufficient speed to be used as an input mechanism for voice-controlled applications 124 that cannot be conveniently or practically controlled using conventional voice commands. Further, in some embodiments, such phonetic fragments can be selected based on the ability of a particular speech recognition program 121 to robustly recognize and distinguish the phonetic fragment from normal speech and/or other phonetic fragments.

As described in further detail below, one or more phonetic fragments are respectively mapped, via one or more utterance-to-command mappings 122, to a particular command 133 for voice-controlled application 124. Consequently, when user 101 produces a verbal utterance 102 that is recognized by computing device 120 as one such phonetic fragment, a verbal utterance interpreter 125 inputs the command 133 for voice-controlled application 124 that is mapped to the recognized phonetic fragment. For example, in an embodiment in which voice-controlled application 124 is a video game, the phonetic fragment "juh" can be mapped to a command that is executed by voice-controlled application 124 in response to a user depressing a game controller button corresponding to a jump action in a video game; the phonetic fragment "tuh" can be mapped to a command that is executed by voice-controlled application 124 in response to a user depressing a game controller button corresponding to a shoot action in a video game; and so on. Thus, some or all of the user inputs for a particular voice-activated application 124 can be provided to computing device 120 either in lieu of or addition to a manual input device, such as a video game controller, touch-sensitive screen, or key board.

In some embodiments, phonetic fragments can be selected for a particular application based on the ability of a particular user to clearly pronounce the phonetic fragment. Thus, in such embodiments, a set of one or more phonetic fragments employed as inputs to voice-controlled application 124 may include different phonetic fragments depending on what language or languages user 101 can speak fluently. For example, when user 101 is a native Chinese speaker, one set of phonetic fragments may be employed in computing system 100 for inputting commands to voice-controlled application 124, whereas when user 101 is a native English speaker, a different set of phonetic fragments may be employed in computing system 100 for that purpose.

Microphone 103 may be any technically feasible device capable of converting verbal utterance 102 into audio signal 131. Audio signal is an electrical signal, such as a digital audio stream. In some embodiments, microphone 103 generates an analog electrical output that is then converted into such a digital audio stream. Alternatively, microphone 103 generates such a digital audio stream directly. Microphone 103 may be a stand-alone device, or may be incorporated into another electronic device, such as a head set, laptop computer, or home automation system. Microphone 103 may be connected to computing device 120 via a wired and/or wireless connection.

It is noted that some of the phonetic fragments included in a set of phonetic fragments mapped to commands 133 may be difficult for conventional speech-recognition applications 121 and natural language processing algorithms to distinguish. For example, the different between the phonetic fragments "juh" and "tuh" is the initial consonant, which can sound similar to each other. Frequently, the initial consonant of a word cay be indirectly determined by conventional speech-recognition applications 121 and natural language processing algorithms based on context. However, the utterance of phonetic fragments for use as an input to voice-controlled application 124 generally has no such clarifying context, since each phonetic fragment is issued as a stand-alone command and is not part of a completely pronounced word or phrase. Consequently, in some embodiments, differentiation between phonetic fragments by speech-recognition application 121 can be facilitated when microphone 103 is configured to generate a high-quality audio signal 131. For example, in such embodiments, microphone 130 may include one or more condenser microphones or other high-fidelity microphones.

Speech recognition application 121 is a computer application configured to recognize and translate spoken language into text, such as a speech-to-text (STT) application. Thus, speech recognition application 121 receives audio signal 131 from microphone 103 and generates a verbal utterance indicator 132. Verbal utterance indicator 132 may be any suitable indicator that uniquely identifies a particular phonetic fragment that is mapped to a particular command 133 for voice-controlled application 124. In some embodiments, verbal utterance indicator 132 includes a text element or elements that identifies a particular phonetic fragment included in verbal utterance 102. Alternatively or additionally, verbal utterance indicator 132 includes any other identifier or identifying value that uniquely references the particular phonetic fragment included in verbal utterance 102.

In the embodiment illustrated in FIG. 1, speech recognition application 121 is running on computing device 120. Alternatively, in some embodiments, computing device 120 is communicatively connected to a network 105, which may be any technically feasible type of communications network that allows data to be exchanged between computing device 120 and external entities or computing devices (not shown). For example, network 105 may include a wide area network (WAN), a local area network (LAN), a wireless (WiFi) network, and/or the Internet, among others. In such embodiments, speech recognition program 121 can be running on a remote computing device and/or on a distributed computing system. For example, in one such embodiment, computing device 120 is a home automation system that is communicatively coupled to the Internet, and the functionality of speech recognition program 121 is located remotely from computing device 120. In such an embodiment, the computationally intensive operations associated with speech recognition program 121 do not have to be performed by computing device 120.

Verbal utterance interpreter 125 is a computer application configured to determine a command for voice-controlled application 124 based on a verbal utterance indicator 132. Verbal utterance interpreter 125 is further configured to input the command so determined to voice-controlled application 124. To that end, verbal utterance interpreter 125 generally includes one or more utterance-to-command mappings 122.

Utterance-to-command mapping 122 generally includes at least one mapping of a set of one or more phonetic fragments or verbal utterance indicators 132 to respective commands for voice-controlled application 124. Specifically, for each phonetic fragment entry (or verbal utterance indicator 132) included in utterance-to-command mapping 122, there is a corresponding command entry for voice-controlled application 124. Thus, when a verbal utterance indicator 132 is generated by speech recognition application 121, verbal utterance interpreter 125 can determine a specific command intended for input to voice-controlled application 124 by user 121 by consulting utterance-to-command mapping 122. The specific command so determined is depicted as command 133 in FIG. 1. One embodiment of utterance-to-command mapping is illustrated in FIG. 2.

Figure 2:
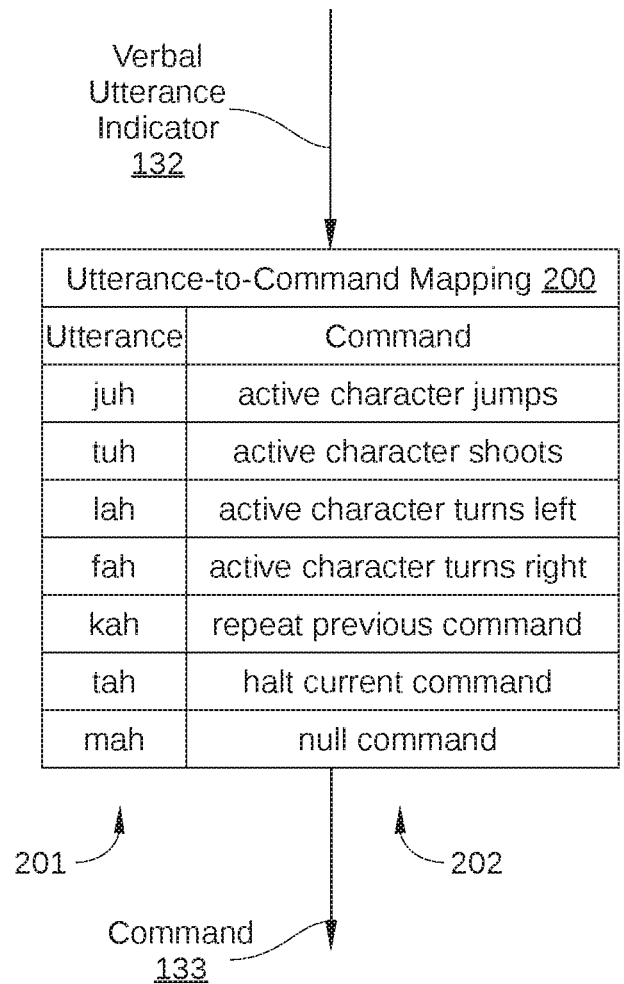
FIG. 2 is a conceptual diagram of an utterance-to-command mapping, according to various embodiments of the present invention.

FIG. 2 is a conceptual diagram of utterance-to-command mapping 122, according to various embodiments of the present invention. Utterance-to-command mapping 122 includes multiple utterance entries 201 and respective and corresponding command entries 202. In the embodiment illustrated in FIG. 2, each utterance entry 201 is a text entry. In such an embodiment, a verbal utterance indicator 132 generated by speech recognition application 121 can include textual data that can be employed to indicate a particular command in utterance-to-command mapping 122. For example, when verbal utterance 102 is the phonetic fragment "juh," speech recognition application 121 includes the text "j-u-h" in verbal utterance indicator 132. Based on such textual data, verbal utterance interpreter 125 can then determine that user 101 intends to input the command 133 into voice-controlled application 124 that causes the active character in a video game associated with voice-controlled application 124 to jump. Alternatively or additionally, in some embodiments, verbal utterance indicator 132 may include any suitable unique indicator value for a particular phonetic fragment. In either case, utterance-to-command mapping 122 enables verbal utterances 102 that have been converted to verbal utterance indicators 132 to be interpreted as specific commands 133 for voice-controlled application 124.

When user 101 pronounces a succession of verbal utterances 102 that are each a phonetic fragment included in utterance-to-command mapping 122, each instance of these verbal utterances 102 is converted to a particular verbal utterance indicator 132 by speech recognition application 121. Each of these multiple verbal utterance indicators 132 can then be interpreted, via utterance-to-command mapping 122, as a command 133 to be input into voice-controlled application 124.

In the context of video games and some other applications, being able to repeatedly input a particular command as quickly as possible can facilitate use of the video game or application. Because each verbal utterance indicator 132 is derived from an easily pronounced phonetic fragment, user 101 can input a quick succession of a particular command 133 or different commands 133 to voice-controlled application 124 via verbal utterances 102. It is noted that certain combinations of phonetic fragment pairs can be pronounced more quickly by a typical user than simply pronouncing the same phonetic fragment twice in a row. Thus, in some embodiments, a particular command 133 can be repeatedly input to voice-controlled application 124 more quickly by alternating the pronunciation of one verbal utterance with another verbal utterance. That is, utterances of a phonetic fragment mapped in utterance-to-command mapping 122 to a specific command 133 can be interspersed with utterances of a phonetic fragment that is mapped to a "repeat previous command" entry in utterance-to-command mapping 122. For example, in one such an embodiment, user 101 can cause a "shoot" command to be input into voice-controlled application 124 six times in very quick succession by alternately pronouncing the phonetic fragments "tuh" and "kah" three times, to wit: "tuh-kah-tuh-kah-tuh-kah". In this way, a particular command 133 can be input, via two different verbal utterances 102, faster than by simply repeating the same verbal utterance "tuh" six times. In fact, many such combinations of phonetic fragments can enable a particular command to be repeatedly input into voice-controlled application 124 even more quickly than user 101 can actuate a mechanical input device, such as a shoot button on a video game controller.

In a similar vein, in some embodiments, one or more phonetic fragments may be mapped to an entry in utterance-to-command mapping 122 that is not a specific command for voice-controlled application 124. For example, in some embodiments, a phonetic fragment, e.g., "tah," is mapped to a "halt previous command" entry in utterance-to-command mapping 122. Thus, when user 101 pronounces the phonetic fragment "tah," a previously issued command 133 that is still being performed is halted, such as a "continuously turn left" command, a "run forward" command, a "continuously back up" command, and the like. In another example, in some embodiments, a phonetic fragment, e.g., "mah," is mapped to a "null" entry in utterance-to-command mapping 122. Thus, when user 101 pronounces the phonetic fragment "mah," no particular command 133 is input into voice-controlled application 124, and instead acts as a verbal spacer. Advantageously, the pronunciation of such a null command by user 101 between instances of a repeatedly spoken phonetic fragment can enable user 101 to improve the control of the count, pace, and/or timing of the pronunciation of phonetic fragments that are mapped to specific commands 133. Therefore, employing such a null command enables improved control of the count, pace, and/or timing of the commands 133 input into voice-controlled application 124.

In the embodiment of utterance-to-command mapping 122 illustrated in FIG. 2, each phonetic fragment that is associated with a particular command 133 for voice-controlled application 124 is mapped to a particular command entry 202, where that particular command entry 202 indicates a particular command 133 to be input into voice-controlled application 124. In other embodiments, a particular phonetic fragment can be indirectly mapped to a particular command 133 in utterance-to-command mapping 122. One such embodiment is illustrated in FIG. 3.

Figure 3:
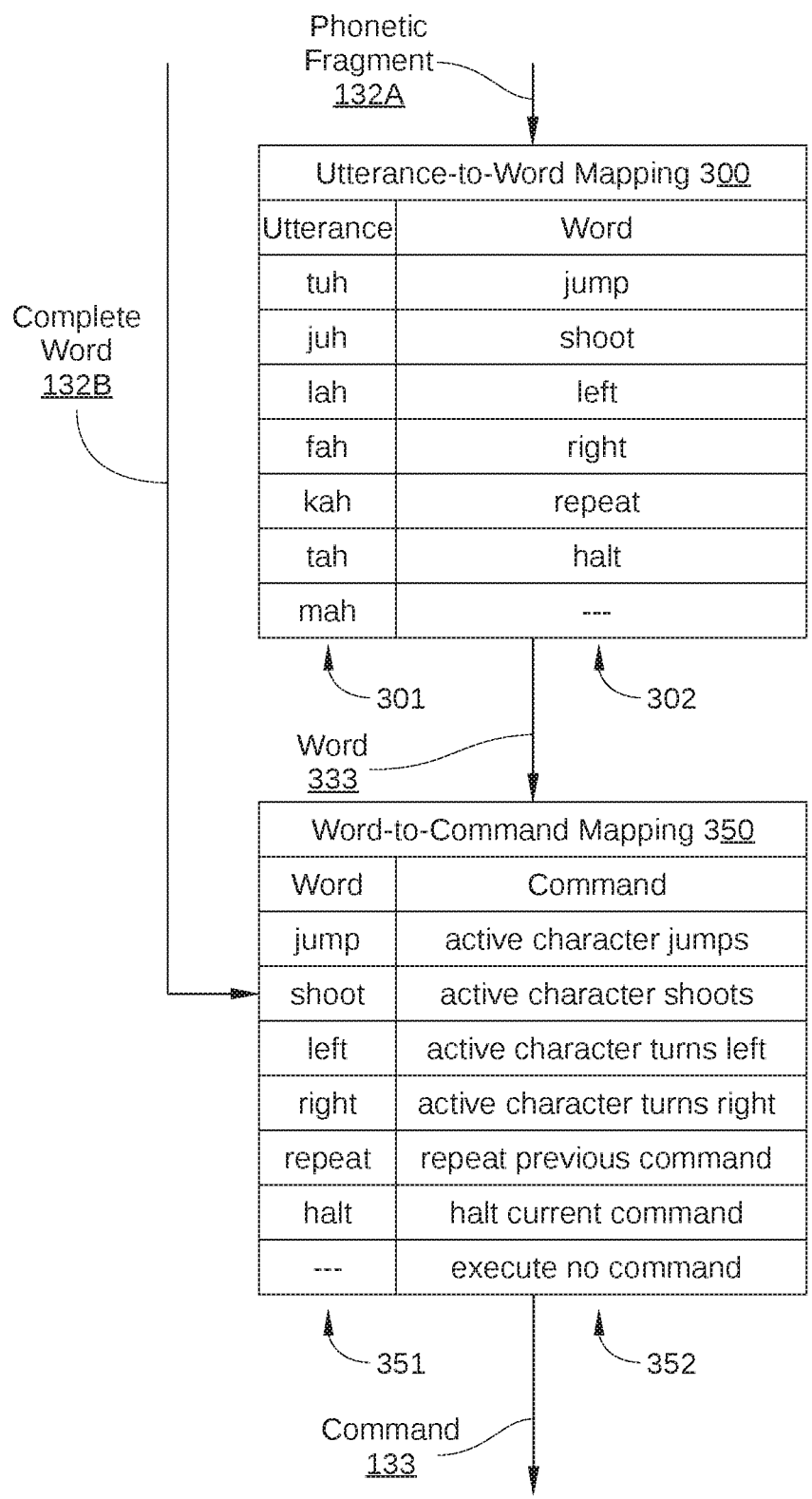
FIG. 3 is a conceptual diagram of an utterance-to-command mapping, according to various other various embodiments of the present invention.

FIG. 3 is a conceptual diagram of utterance-to-command mapping 122, according to other various embodiments of the present invention. In the embodiment illustrated in FIG. 3, utterance-to-command mapping 122 includes an utterance-to-word mapping 300 and a word-to-command mapping 350. Together, utterance-to-word mapping 300 and word-to-command mapping 350 map a particular phonetic fragment pronounced by user 101 to a particular command 133 to be input to voice-controlled application 124. To that end, utterance-to-word mapping 300 includes multiple utterance entries 301 and respective and corresponding word entries 302, while word-to-command mapping 350 includes multiple word entries 351 and respective and corresponding command entries 352. In the embodiment illustrated in FIG. 3, each utterance entry 301, each word entry 302, and each word entry 351 is a text entry. However, in other embodiments, any suitable unique indicator may be employed in lieu of text data for utterance entries 301, word entries 302, and word entries 351.

An advantage of indirectly mapping particular phonetic fragments to respective commands 133 in utterance-to-command mapping 122 is that complete words can also be employed to indicate that user 101 intends for a particular command 133 to be input into voice-controlled application 124. That is, in such embodiments, either complete words or phonetic fragments can be pronounced by user 101 to input commands 133 into voice-controlled application 124. Thus, when user 101 pronounces a particular verbal utterance 102 that is a phonetic fragment indirectly mapped to a particular command 133, speech recognition application 121 generates a phonetic fragment 332A that indicates a particular word 333, via utterance-to-word mapping 300. In turn, word 333 indicates a particular command 133, via word-to-command mapping 350. By contrast, when a particular verbal utterance 102 is a completely pronounced word that is associated with a particular command 133, when user 101 pronounces that particular word, speech recognition application 121 generates a phonetic fragment 332B that is a complete word, and that indicates the particular command 133, via word-to-command mapping 350. Therefore, user 101 can input a particular command 133 by pronouncing a complete word mapped to that command 133, such as "shoot," or by pronouncing a phonetic fragment that is indirectly mapped to that command 133, such as "tuh."

Returning to FIG. 1, voice-controlled application 124 can be any voice-enabled software application or application that includes voice-controllable functions, such as a video game, a home automation system voice interface, or an intelligent personal assistant (IPA) enabled device. In some embodiments, voice-controlled application 124 generates an output 134 for output device 150 in response to a command 133 being input therein. Thus, in embodiments in which output device includes a display screen, output 134 includes causing a video output to be displayed by the display device. Similarly, when output device 150 includes an audio device, output 134 includes causing an audio output to be generated by the audio device. Output device 150 can include any suitable output device or devices for computing system 100, such as a computer monitor, a video display screen, a display apparatus incorporated into a hand held device, any other technically feasible display screen configured to present dynamic or animated media to an end-user, one or more loudspeakers, one or more visible status indicators, such as light-emitting diodes (LEDs), and the like.

In some embodiments, one or more phonetic fragments can be used in conjunction with and/or to augment other inputs or controls for voice-controlled application 124. When user interactions with voice-activated application 124 involve user inputs or commands being directed to multiple recipients (virtual or actual), phonetic fragments can be employed to facilitate such communications. For example, when voice-activated application 124 is video game in which user 101 is a general, user 101 may have multiple commanders (either real or virtual) in the field that can each receive communications. In such embodiments, user 101 can employ a manual input device, such as a game controller or computer keyboard, to select a general to receive commands or other communications, and voice shortcuts, i.e., phonetic fragments, to send abbreviated commands quickly to the selected commander. Alternatively, in some embodiments, the inverse approach can also be employed, in which user 101 utters phonetic fragments to quickly switch between commanders in the field, so that the manual input device can be dedicated to generate suitable commands or other communications for the selected commander.

In another example, the number of possible entities or objects controllable by user 101 can be increased via phonetic fragments. For example, a virtual or actual robot with more appendages/actuators than can be controlled with one or more manual input devices can be more effectively controlled with the additional use of phonetic fragments. Specifically, phonetic fragments can be employed to toggle between the different appendages/actuators, which then receive inputs or commands from user 101 via a manual input device. Alternatively or additionally, phonetic fragments can be employed to select a specific appendages or actuator that will then receive inputs or commands from user 101 via a manual input device. Alternatively or additionally, phonetic fragments can be employed to provide one or more inputs or commands to a previously selected appendages or actuator, so that user 101 can reserve use of a manual input device for inputting commands to a different appendage or actuator of the robot.

In yet another example, in some embodiments, user 101 can employ phonetic fragments to pause or resume the action of a video game or other voice-controlled application without releasing or changing grip on the manual input device. In such embodiments, much more precise pausing and resuming is enables, since user 101 can control voice-controlled application 124 via a manual input device up to the exact moment that the game is paused via the phonetic fragment.

Computing device 120 can be any technically feasible computing device capable of executing voice-controlled application 124 and verbal utterance interpreter 125, receiving an audio signal 131 from microphone 103, determining a command 133 for the voice-controlled application based on verbal utterance indicator 132, and inputting the command 133 to voice-controlled application 124. Thus, computing device 120 may be any suitable general or special purpose computer, including but not limited to a gaming console, a personal computer, a laptop, a tablet computer, a mobile device, a cellular phone, a tablet, a smart speaker or home automation system, a set-top box, and a media streaming device, among others. For example, in some embodiments, computing device 120 may have the configuration described below in conjunction with FIG. 4.

Figure 4:
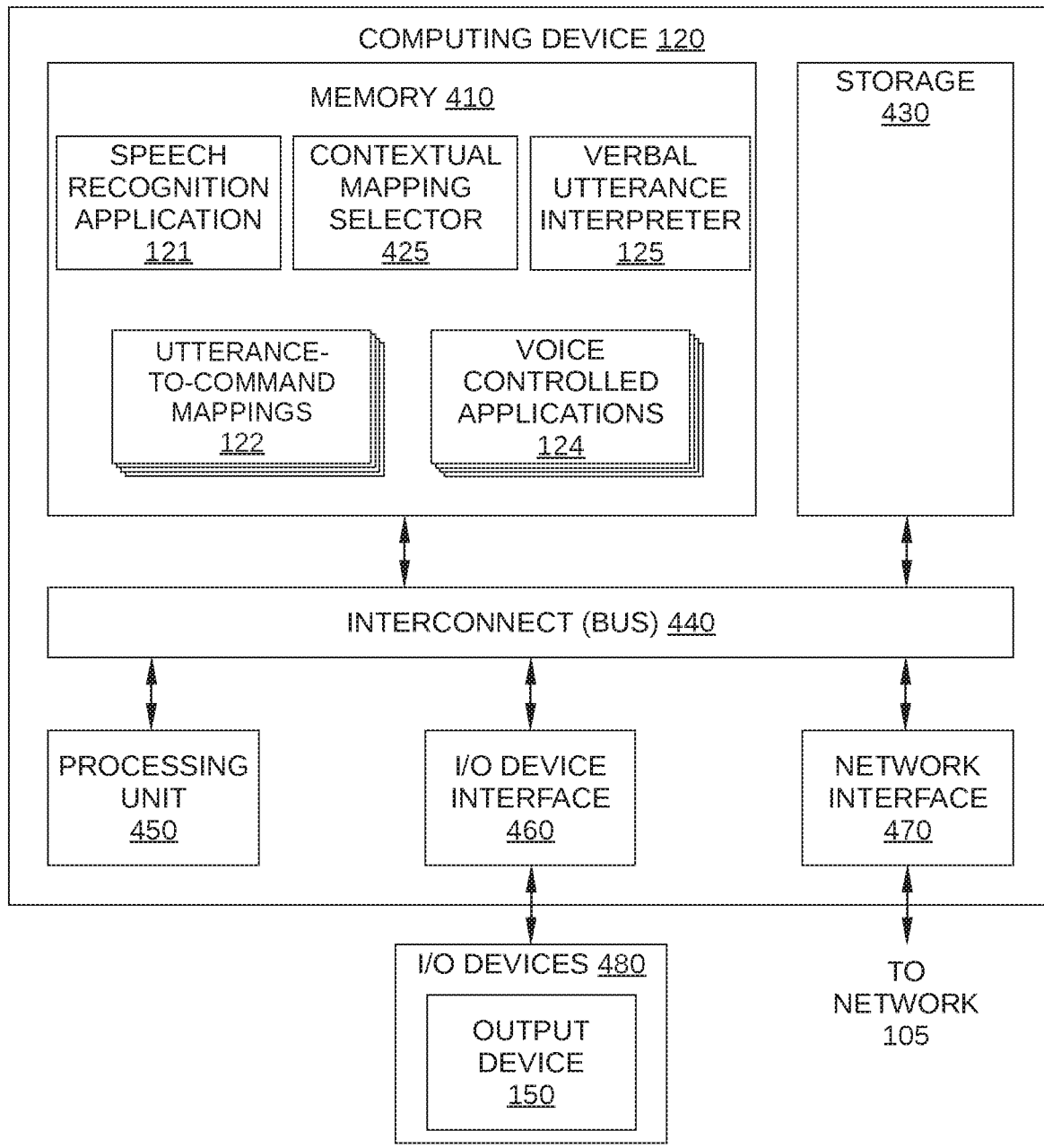
FIG. 4 is an illustration of the computing device of FIG. 1, according to various embodiments of the present invention.

FIG. 4 is an illustration of computing device 120, according to various embodiments of the present invention. As noted, computing device 120 may be a desktop computer, a laptop computer, a smart phone, or any other type of computing device suitable for practicing one or more embodiments of the present invention. In operation, computing device 120 is configured to execute one or more of speech recognition application 121, voice-controlled application 124, verbal utterance interpreter 125, and/or contextual mapping selector 425 (described below in conjunction with FIG. 5), as described herein. It is noted that the computing device described herein is illustrative and that any other technically feasible configurations fall within the scope of the present invention.

Computing device 120 is further configured to perform a response executed by voice-controlled application 124 after inputting command 133 into voice-controlled application 124. Such responses include causing a visual output to be displayed on output device 150 and/or causing an audio output to be generated by output device 150. For example, in one embodiment, voice-controlled application 124 is a video game application and command 133 corresponds to an input signal from a manual input device, such as a "shoot" button, a "jump" button, or one or more joystick directional buttons. In such an embodiment, in response to inputting command 133 into voice-controlled application 124, computing device 120 causes a suitable visual output to be displayed and/or a suitable audio output to be generated. Thus, a "shoot," "jump," or other command can be input by user 101 via a verbal cue, such as verbal utterance 102, rather than by manually depressing a mechanical button or actuating a joystick controller in a particular direction.

Alternatively or additionally, in some embodiments, a response executed by voice-controlled application 124 may be an internal process triggered by command 133, rather than a visual or audio output. For example, in one such embodiment, voice-controlled application 124 is a home automation application and/or an IPA, and command 133 corresponds to a particular voice command, such as "cancel current request," "stop current action," "repeat previous command," "what is the outside temperature right now?," "turn off all devices in this room," and the like. Consequently, in such an embodiment, in response to inputting command 133 into voice-controlled application 124, computing device 120 performs (or halts) some operation associated with the home automation application or the IPA. Thus, because a phonetic fragment can be employed to input a command to voice-controlled application 124, user 101 can provide certain inputs to voice-controlled application 124 without speaking entire words or sentences. As noted above, compared to using a complete word or phrase for voice control of an application, phonetic fragments can be more quickly spoken, can be more reliably recognized by speech recognition application 121, and are less apt to interrupt other user activities, such as conducting a conversation.

As shown, computing device 120 includes, without limitation, an interconnect (bus) 440 that connects a processing unit 450, an input/output (I/O) device interface 460 coupled to input/output (I/O) devices 480, memory 410, a storage 430, and a network interface 470. Processing unit 450 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU or digital signal processor (DSP). In general, processing unit 450 may be any technically feasible hardware unit capable of processing data and/or executing software applications, including speech recognition program 121, voice-controlled application 124, verbal utterance interpreter 125, and/or contextual mapping selector 425. Further, in the context of this disclosure, the computing elements shown in computing device 120 may correspond to a physical computing system (e.g., a system in a data center) or may be a virtual computing instance executing within a computing cloud.

I/O devices 480 may include devices capable of providing input, such as a keyboard, a mouse, a touch-sensitive screen, microphone 103, and so forth, as well as devices capable of providing output, such as output device 150. Additionally, I/O devices 480 may include devices capable of both receiving input and providing output, such as a touchscreen, a universal serial bus (USB) port, and so forth. I/O devices 480 may be configured to receive various types of input from an end-user of computing device 120, and to also provide various types of output to the end-user of computing device 120, such as displayed digital images or digital videos. In some embodiments, one or more of I/O devices 480 are configured to couple computing device 120 to a network 105.

Memory 410 may include a random access memory (RAM) module, a flash memory unit, or any other type of memory unit or combination thereof. Processing unit 450, I/O device interface 460, and network interface 470 are configured to read data from and write data to memory 410. Memory 410 includes various software programs that can be executed by processor 450 and application data associated with said software programs, including speech recognition application 121, voice-controlled application 124, one or more utterance-to-command mappings 122, verbal utterance interpreter 125, and/or contextual mapping selector 425.

In some embodiments, verbal utterance interpreter 125 may include multiple utterance-to-command mappings 122, where each utterance-to-command mapping 122 is associated with a different voice-controlled application 124. Because a particular phonetic fragment can be included in two or more of the multiple utterance-to-command mappings 122, the particular phonetic fragment can be mapped to multiple commands 133, each of which is associated with a different voice-controlled application 124. One such embodiment is illustrated in FIG. 5.

Figure 5:
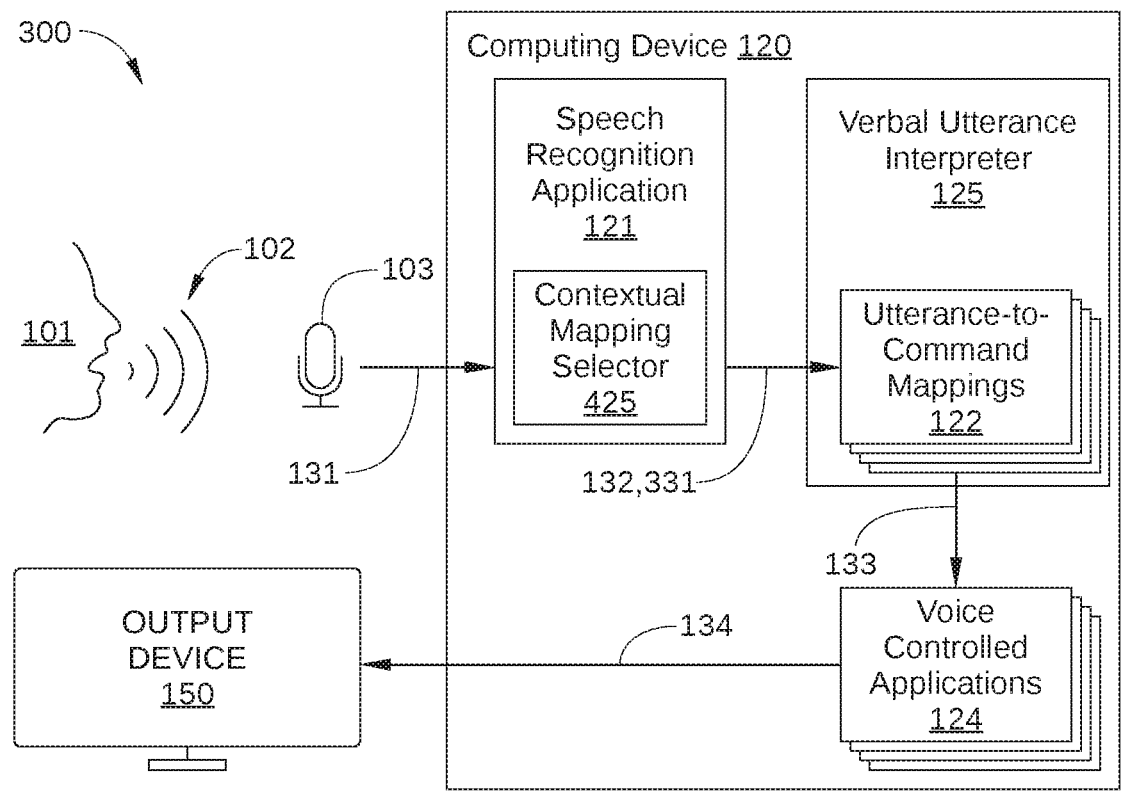
FIG. 5 illustrates a block diagram of another computing system configured to implement one or more aspects of the present invention.

FIG. 5 illustrates a block diagram of a computing system 500, configured to implement one or more aspects of the present invention. Computing system 500 is substantially similar to computing system 100 in FIG. 1, except that computing system 500 includes a contextual mapping selector 425, multiple utterance-to-command mappings 122, and multiple voice-controlled applications 124. In some embodiments two or more of the multiple voice-controlled applications 124 may be running simultaneously on computing device 120.

Contextual mapping selector 425 is a software module configured to determine a primary voice-controlled application 124 from the plurality of voice-controlled applications 124 that may be simultaneously running on computing device 120. More specifically, contextual mapping selector 425 determines such a primary voice-controlled application 124 based on one or more contextual factors. For example, in the embodiment illustrated in FIG. 5, such contextual factors can include, without limitation, a current location of user 101, the current time of day or day of the week, what voice-controlled applications 124 are currently being executed by computing device 120, what voice-controlled applications 124 that are currently being executed by computing device 120 include or are associated with a video game, what voice-controlled applications 124 that are currently causing a visual output to be displayed, what voice-controlled applications 124 that are currently causing an audio output to be generated in the same location as user 101, what voice-controlled applications 124 currently being executed by computing device 120 include or are associated with a home automation system, what voice-controlled applications 124 are currently controlling a home automation device in the same location as user 101, and what voice-controlled application or applications 124 currently being executed by computing device 120 have been designated as a default device by user 101, among others. Thus, based on one or more of the above contextual factors, contextual mapping selector 425 can determine a single voice-controlled application 124 to be the primary voice-controlled application 124, even when a plurality of voice-controlled applications 124 are running concurrently on computing device 120.

Contextual mapping selector 425 is further configured to select a particular utterance-to-command mapping 122 from the group of mappings included in verbal utterance interpreter 125. More specifically, contextual mapping selector 425 is configured to select the utterance-to-command mapping 122 that corresponds to the primary voice-controlled application 124, determined as set forth above. Thus, when speech recognition application 121 generates a verbal utterance indicator 132 in response to a verbal utterance 102, verbal utterance interpreter 125 is configured to employ the utterance-to-command mapping 122 that corresponds to the contextually appropriate voice-controlled application 124. Verbal utterance interpreter 125 then determines the appropriate command 133 that is mapped to that verbal utterance indicator 132. In this way, user 101 can direct input to a specific voice-controlled application 124 via one or more verbal utterances 102, knowing in advance of pronouncing the verbal utterances 102 which voice-controlled application 124 will receive the command.

In the embodiment illustrated in FIG. 5, contextual mapping selector 425 is depicted as a component of speech recognition application 121. In other embodiments, contextual mapping selector 425 may be a stand-alone software, firmware, or hardware module included in or running on computing device 120.

Figure 6:
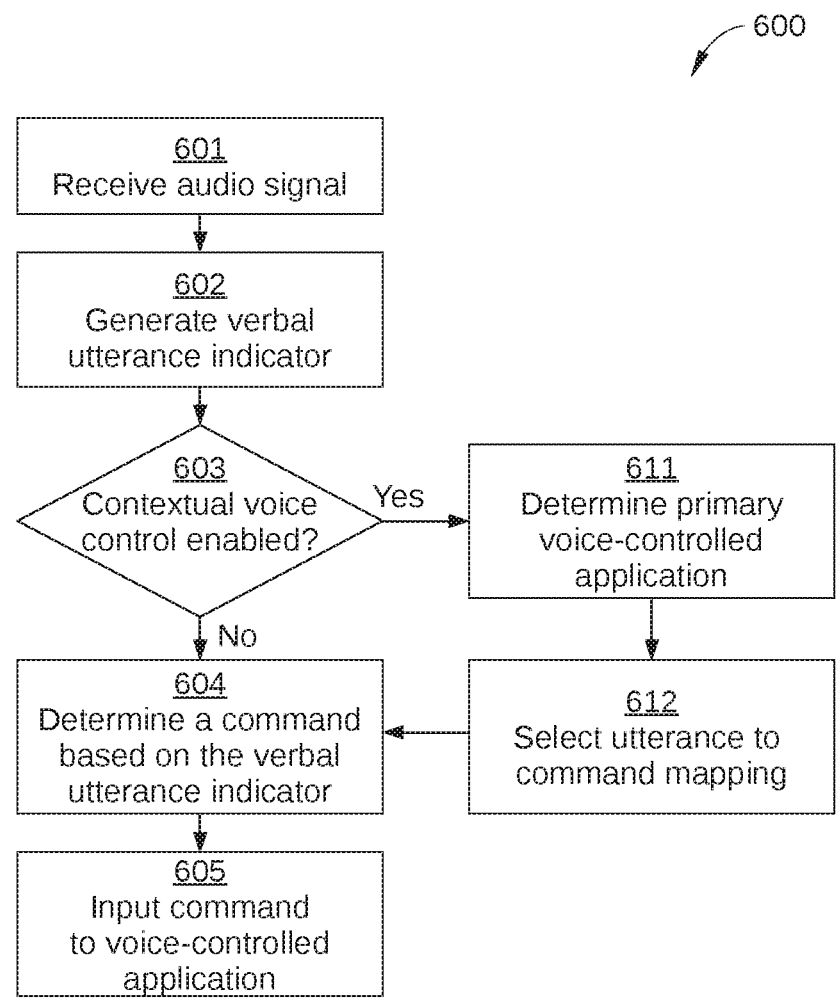
FIG. 6 is a flowchart of method steps for controlling a voice-enabled device using voice commands, according to various embodiments of the present invention.

FIG. 6 is a flowchart of method steps for controlling a voice-enabled device using voice commands, according to various embodiments of the present invention. Although the method steps are described with respect to computing system 100 of FIGS. 1-5, persons skilled in the art will understand that the method steps may be also performed with other computing systems without exceeding the scope of the invention.

As shown, a method 600 begins at step 601, where speech-recognition application 121 receives audio signal 131 from microphone 103. Audio signal 131 can be received via a wired or wireless connection.

In step 602, speech-recognition application 121 generates a verbal utterance indicator 132, based on audio signal 131.

In step 603, verbal utterance interpreter 125 determines whether contextual voice control is enabled or otherwise available. In some embodiments, verbal utterance interpreter 125 determines whether there are multiple voice-controlled applications 124 currently running on computing device 120 that can potentially receive a voice command. If yes, method 600 proceeds to step 611; if no, method 600 proceeds to step 604.

In step 604, verbal utterance interpreter 125 determines, via utterance-to-command mapping 122, a command based on verbal utterance indicator 132. In embodiments in which contextual voice control is enabled or otherwise available, the utterance-to-command mapping 122 employed in step 604 is the utterance-to-command mapping 122 determined in step 612, as set forth below. In embodiments in which contextual voice control is not enabled or otherwise available, there is generally a single suitable utterance-to-command mapping 122 to be employed in step 604, i.e., the utterance-to-command mapping 122 associated with the currently executing voice-controlled application 124.

In step 605, verbal utterance interpreter 125 inputs the command 133 determined in step 604 to the appropriate voice-controlled application 124. In embodiments in which contextual voice control is enabled or otherwise available, the appropriate voice-controlled application 124 is the voice-controlled application 124 determined in step 611, as set forth below. In embodiments in which contextual voice control is not enabled or otherwise available, there is generally a single appropriate voice-controlled application 124, i.e., the currently executing voice-controlled application 124.

In step 611, contextual mapping selector 425 determines the primary voice-controlled application 124, based on one or more contextual factors, as set forth above.

In step 612, contextual mapping selector 425 selects the utterance-to-command mapping 122 that corresponds to the primary voice-controlled application 124 determined in step 611. The selected utterance-to-command mapping 122 can then be employed to determine the command 133 to be input to the primary voice-controlled application 124, as described above in step 604.

In sum, high-speed control of a voice-controlled software application is enabled with the use of phonetic fragments or other verbal cues. Specifically, a speech-recognition application recognizes a phonetic fragment pronounced by a user and generates a corresponding verbal utterance indicator. An utterance-to-command mapping indicates a particular command that corresponds to the verbal utterance indicator, and that command is input into a voice-controlled application. Thus, a phonetic fragment, which can be pronounced very quickly by a user, and readily distinguished from other speech by a speech recognition program, can be employed for inputting commands.

At least one advantage of the disclosed techniques is that they allow a user of a computing device to quickly input commands via verbal cues to a software application executing on the computing device. A further advantage is that verbal cues that are particularly well-suited for inputting commands can be mapped to multiple different commands, depending on the context in which the verbal cue is received by the computing device.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

I claim:

1. A method for controlling a voice-enabled device using voice commands, the method comprising:
    receiving an audio signal that is generated in response to a verbal utterance;
    generating a verbal utterance indicator for the verbal utterance based on the audio signal;
    selecting a first application included in a plurality of applications currently executing on the voice-enabled device that is to receive one or more commands;
    selecting a first command to transmit to the first application based on the verbal utterance indicator comprising:
        upon determining that the verbal utterance indicator comprises a phonetic fragment, performing the steps of:
            performing a first mapping from the verbal utterance indicator to a first complete word via a first mapping table associated with the first application; and
            performing a second mapping from the first complete word to the first command via a second mapping table associated with the first application; and
        upon determining that the verbal utterance indicator comprises the first complete word, performing the second mapping from the first complete word to the first command via the second mapping table without performing the first mapping from the verbal utterance indicator to the first complete word via the first mapping table; and
    transmitting the first command to the first application as an input.

2. The method of claim 1, wherein generating a verbal utterance indicator comprises transmitting the audio signal to a speech recognition application for processing.

3. The method of claim 1, wherein the verbal utterance indicator comprises a textual representation of the verbal utterance.

4. The method of claim 1, wherein selecting the first application included in the plurality of applications comprises at least one of selecting an application included in the plurality of applications that is causing a visual output to be displayed or selecting an application included in the plurality of applications that is causing an audio output to be generated.

5. The method of claim 1, wherein the verbal utterance consists of only a single phonetic fragment.

6. The method of claim 1, wherein the phonetic fragment consists of a single consonant and a single vowel.

7. The method of claim 1, wherein the first application is further selected due to at least one of a current location of a user, a current time, a current day, the first application being associated with a home automation system, or the first application currently controlling a home automation device.

8. The method of claim 1, wherein the first mapping table comprises a plurality of word mappings, each word mapping included in the plurality of word mappings comprising a mapping from a particular phonetic fragment to a particular complete word, the plurality of word mappings including a word mapping for the first complete word.

9. The method of claim 1, wherein the second mapping table comprises a plurality of command mappings, each command mapping included in the plurality of command mappings comprising a mapping from a particular complete word to a particular command, the plurality of command mappings including a command mapping for the first command.

10. The method of claim 1, wherein selecting the first application included in the plurality of applications comprises selecting the first application due to the first application currently outputting video or audio.

11. A non-transitory computer-readable storage medium including instructions that, when executed by a processor, cause the processor to perform the steps of:

receiving an audio signal that is generated in response to a verbal utterance;

generating a verbal utterance indicator for the verbal utterance based on the audio signal;

selecting a first application included in a plurality of applications currently executing on the voice-enabled device that is to receive one or more commands;

selecting a first command to transmit to the first application based on the verbal utterance indicator comprising:

upon determining that the verbal utterance indicator comprises a phonetic fragment, performing the steps of:

performing a first mapping from the verbal utterance indicator to a first complete word via a first mapping table associated with the first application; and performing a second mapping from the first complete word to the first command via a second mapping table associated with the first application; and upon determining that the verbal utterance indicator comprises the first complete word, performing the second mapping from the first complete word to the first command via the second mapping table without performing the first mapping from the verbal utterance indicator to the first complete word via the first mapping table; and transmitting the first command to the first application as an input.

12. The non-transitory computer-readable storage medium of claim 11, wherein the verbal utterance consists of only a single consonant and a single vowel.

13. The non-transitory computer-readable storage medium of claim 11, further comprising:

after receiving the audio signal, receiving an additional signal that is generated in response to an additional verbal utterance, wherein the addition verbal utterance is different than the verbal utterance; and transmitting an additional command to the first application based on the additional verbal utterance, wherein the additional command acts to cancel the first command transmitted to the first application.

14. The non-transitory computer-readable storage medium of claim 11, further comprising:

after receiving the audio signal, receiving an additional signal that is generated by the microphone in response to an additional verbal utterance, wherein the additional verbal utterance is different than the verbal utterance; and with the processing unit, based on the additional verbal utterance, transmitting the first command to the first application.

15. The non-transitory computer-readable storage medium of claim 11, wherein generating a verbal utterance indicator comprises transmitting the audio signal to a speech recognition application for processing.

16. The non-transitory computer-readable storage medium of claim 11, wherein the verbal utterance indicator comprises a textual representation of the verbal utterance.

17. A system, comprising:

a microphone;

a memory storing a speech recognition application and a verbal utterance translator; and one or more processors that are coupled to the memory and the microphone, and when executing the speech recognition application or the verbal utterance translator, are configured to:

receive an audio signal that is generated in response to a verbal utterance;

generate a verbal utterance indicator for the verbal utterance based on the audio signal;

select a first application included in a plurality of applications currently executing on the voice-enabled device that is to receive one or more commands;

select a first command to transmit to the first application based on the verbal utterance indicator comprising:

upon determining that the verbal utterance indicator comprises a phonetic fragment, performing the steps of:

performing a first mapping from the verbal utterance indicator to a first complete word via a first mapping table associated with the first application; and performing a second mapping from the first complete word to the first command via a second mapping table associated with the first application; and upon determining that the verbal utterance indicator comprises the first complete word, performing the second mapping from the first complete word to the first command via the second mapping table without performing the first mapping from the verbal utterance indicator to the first complete word via the first mapping table; and transmit the first command to the first application as an input.

18. The system of claim 17, wherein the speech recognition application is running on the processor.

19. The system of claim 17, wherein the speech recognition application is running on a remote processor that is communicatively connected to the computing device.

\* \* \* \* \*